United States Patent Office
3,558,654
Patented Jan. 26, 1971

3,558,654
SEMICARBAZONE AND THIOSEMICARBAZONE QUATERNARY SALTS
David George Bamford, London, David Frederick Biggs, Loughton, Peter Chaplen, Grays, Michael Davis, Upminster, and David John Sheffield, Wickford, England, assignors to May & Baker Limited, Dagenham, Essex, England, a British company
No Drawing. Filed Aug. 14, 1967, Ser. No. 660,225
Claims priority, application Great Britain, Aug. 23, 1966, 37,800/66; July 7, 1967, 31,375/67
Int. Cl. C07c 157/00; C07d 27/04
U.S. Cl. 260—326.83
17 Claims

ABSTRACT OF THE DISCLOSURE

Semicarbazone and thiosemicarbazone quaternary salts of the formula:

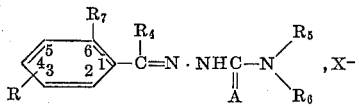

wherein R represents a group $R_1R_2R_3N^+$ in the 3- or 4-position of the benzene radical, in which $R_1$, $R_2$ and $R_3$ each represent a lower alkyl group or $R_1$ and $R_2$, together with the nitrogen atom to which they are attached, represent a saturated, monocyclic heterocyclic group, $R_4$ represents a hydrogen atom, an alkyl or alkenyl group containing a maximum of 12 carbon atoms, or a cycloalkyl group containing 3 to 8 carbon atoms, A represents an oxygen or sulphur atom, $R_5$ and $R_6$ each represent a hydrogen atom or a lower alkyl group, with the proviso that $R_4$, $R_5$ and $R_6$ are not simultaneously hydrogen atoms, $R_7$ represents a hydrogen atom or $R_7$ and $R_4$ linked together represent a trimethylene chain —$(CH_2)_3$—, and $X^-$ represents a pharmaceutically acceptable anion, are useful as neuromuscular blocking agents.

This invention relates to quaternary salts of pharmacological value, to processes for their preparation, and to pharmaceutical preparations containing them.

According to the present invention there are provided the new semicarbazone and thiosemicarbazone quaternary salts of the general formula:

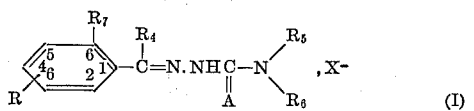

wherein R represents a group $R_1R_2R_3N^+$ in the 3- or 4-position of the benzene radical, in which $R_1$, $R_2$ and $R_3$ are the same or different and each represents a lower alkyl group or $R_1$ and $R_2$, together with the nitrogen atom to which they are attached, represent a saturated, monocyclic heterocyclic group, which may optionally contain oxygen as a second hetero atom, such as pyrrolidin-1-yl, piperidino or morpholino, $R_4$ represents a hydrogen atom, an alkyl or alkenyl group containing a maximum of 12 carbon atoms, or a cycloalkyl group containing 3 to 8 carbon atoms. A represents an oxygeno or sulphur atom, $R_5$ and $R_6$ are the same or different and each represents a hydrogen atom or a lower alkyl group, with the proviso that $R_4$, $R_5$ and $R_6$ are not simultaneously hydrogen atoms, $R_7$ represents a hydrogen atom or $R_7$ and $R_4$ linked together represent a trimethylene chain —$(CH_2)_3$—, and $X^-$ represents a pharmaceutically acceptable anion.

By the term "lower alkyl" as used in this specification and accompanying claims is meant alkyl groups containing from 1 to 4 carbon atoms. By the term "pharmaceutically acceptable anion" is meant an anion which is non-toxic at the dosages used. Suitable anions include halide ions, e.g. bromide, iodide, and chloride ions, ions of the formula $R_8$—$SO_2$—$O^-$, wherein $R_8$ represents an alkoxy, alkyl, hydroxyalkyl, or mononuclear aryl group (for example methylsulphate, ethylsulphate, methanesulphonate, ethanesulphonate, β - hydroxyethantsulphonate, benzenesulphonate and touene-p-sulphonate), and ions derived from organic carboxylic acids, e.g. a tartrate or citrate ion.

The compounds of Formula I possess pharmacological preperties which render them useful as neuromuscular blocking agents. In particular, p-dimethylaminobenzaldehyde methiodide 4'-methylthiosemicarbazone, and those compounds of Formula I in which $R_1$, $R_2$ and $R_3$ represent lower alkyl groups, particularly methyl or ethyl groups, or $NR_1R_2$ represents a pyrrolidin-1-yl group, $R_4$ represents a cyclohexyl group or an alkyl group of 2 to 10 carbon atoms, more especially a butyl, hexyl or heptyl group, or $R_4$ and $R_7$ linked together represent a trimethylene chain, and $R_5$ and $R_6$ represent hydrogen atoms or methyl groups, are short-acting neuromuscular blocking agents, which have a competitive tubocurarine-like action. Such compounds are, for example, p-dimethylaminophenyl ethyl ketone methiodide thiosemicarbazone, p-dimethylaminophenyl propyl ketone methiodide thiosemicarbazone, p-dimethylaminophenyl propyl ketone methiodide 4'-methylthiosemicarbazone, p-dimethylaminophenyl propyl ketone methiodide 4',4'-dimethylthiosemicarbazone, p-diethylaminophenyl propyl ketone methiodide thiosemicarbazone, p-dimethylaminophenyl butyl ketone ethiodide thiosemcarbazone, p-dimethylaminophenyl cyclohexyl ketone methiodide thiosemicarbazone, p-diethylaminophenyl heptyl ketone methiodide thiosemicarbazone, p-dimethylaminophenyl heptyl ketone propiodide thiosemicarbazone, p-dimethylaminophenyl octyl ketone methiodide thiosemicarbazone, p-dimethylaminophenyl nonyl ketone methiodide thiosemicarbazone, p-dimethylaminophenyl decyl ketone methiodide thiosemicarbazone, p-dimethylaminophenyl propyl ketone methiodide semicarbazone, p-dimethylaminophenyl butyl ketone ethiodide semicarbazone, p-diethylaminophenyl butyl ketone methiodide semicarbazone, p-dimethylaminophenyl hexyl ketone methiodide semicarbazone, p-dimethylaminophenyl heptyl ketone ethiodide semicarbazone, p-diethylaminophenyl, heptyl ketone methiodide semicarbazone, p-dimethylaminophenyl octyl ketone methiodide semicarbazone, p-dimethylaminophenyl nonyl ketone methiodide semicarbazone, 6-dimethylamino-1-tetralone ethiodide thiosemicarbazone, 6-dimethylamino-1-tetralone ethiodide semicarbazone, 6-diethylamino-1-tetralone methiodide semicarbazone, 6-pyrrolidin-1'-yl - 1 - tetralone methotoluene-p-sulphonate thiosemicarbazone, m-dimethylaminophenyl heptyl ketone methiodide thiosemicarbazone, and, more especially, p-diethylaminophenyl butyl ketone methiodide thiosemicarbazone, p-diethylaminophenyl butyl ketone methochloride thiosemicarbazone, p-dimethylaminophenyl hexyl ketone methiodide thiosemicarbazone, p-dimethylaminophenyl heptyl ketone methiodide thiosemicarbazone, p-dimethyl aminophenyl heptyl ketone ethiodide thiosemicarbazone, p-dimethylaminophenyl heptyl ketone ethochloride thiosemicarbazone, p-pyrrolidin-1'-yl-phenyl heptyl ketone methotoluene-p-sulphonate thiosemicarbazone, p-dimethylaminophenyl heptyl ketone methiodide semicarbazone, 6-dimethylamino-1-tetralone methiodide thiosemicarbazone and 6-dimethylamino-1-tetralone methiodide semicarbazone. The ten last-mentioned compounds are particularly preferred compounds of the invention.

The compounds of general Formula I may be prepared by known methods for the preparation of aldehyde or ketone semicarbazones and thiosemicarbazones. Thus, according to a feature of this invention, the compounds of formula I are prepared by the reaction of a quaternised aldehyde or ketone of the general formula:

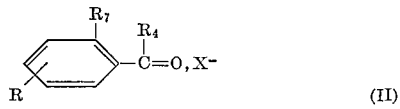

wherein R, R₄, R₇ and X⁻ are as hereinbefore defined, with a semicarbazide or thiosemicarbazide of the general formula:

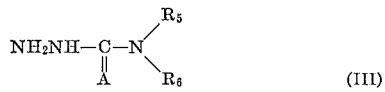

wherein A, R₅ and R₆ are as hereinbefore defined. The reaction is preferably carried out in an inert solvent such as a lower aliphatic alcohol, e.g. ethanol, or water. By the term "lower aliphatic alcohol" as used in this specification and accompanying claims is meant an aliphatic alcohol containing from 1 to 4 carbon atom.

The starting materials of Formula II may be prepared by known methods for the preparation of quaternary salts of amino aldehydes and ketones, for example by the following methods:

(a) In the case of those compounds wherein R₇ represents a hydrogen atom and the group R (or R₁R₂R₃N⁺) is in the 4-position, disubstituted anilines of the general formula:

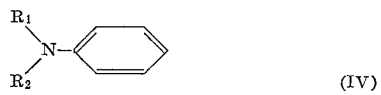

(wherein R₁ and R₂ are as hereinbefore defined) are condensed with acids of formula R₄COOH (wherein R₄ is as hereinbefore defined), or a suitable derivative thereof such as an amide, to give the corresponding amino aldehydes or ketones of the general formula:

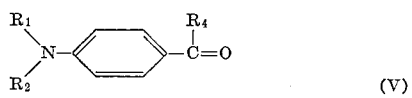

wherein R₁, R₂ and R₄ are as hereinbefore defined. The reaction may be carried out in the presence of a dehydrating agent, such phosphorus pentoxide or phosphorus oxychloride, in the presence of an inert solvent, which is conveniently an excess of the disubstituted aniline of Formula IV.

The amino aldehydes and ketones of Formula V are then quaternised by known methods with a compound of formula R₃X₁ wherein R₃ is as hereinbefore defined and X₁ is the acid residue of a reactive ester, e.g. a halogen atom or toluene-p-sulphonate group. The reaction is preferably carried out by heating a mixture of a compound of Formula V with an excess of the alkyl reactant R₃X₁ under reflux for a period of from one to several days.

(b) In the case of those compounds wherein R₄ and R₇ together represent a trimethylene chain, a tetralone of the formula:

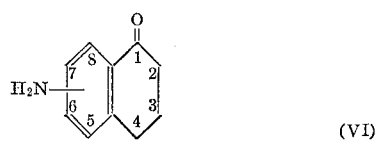

wherein the amino group is in 6- or 7-position, is converted by known methods for the alkylation of an amino group into a tetralone of the general formula:

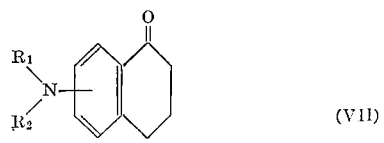

wherein R₁ and R₂ are as hereinbefore defined, which is then quaternised with a compound of formula R₃X₁ as described above. When R₁, R₂ and R₃ are the same alkyl group, it is possible to carry out the two reactions simultaneously.

The 6-amino-1-tetralone can be prepared according to Allinger and Jones, J. Org. Chem., 1962, 27, 70, and the 7-amino-1-tetralone can be prepared according to Von Braun, Annalen, 451, 40.

(c) A carbinol of the general formula:

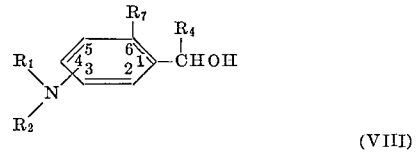

wherein R₁R₂N is in the 3- or 4-position and R₁, R₂, R₄ and R₇ are as hereinbefore defined, is oxidised by known methods to an aldehyde or ketone of the general formula:

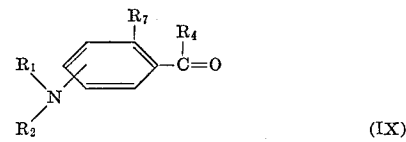

the tertiary amino group of which is then quaternised with a compound of formula R₃X₁ as described above. The oxidation of the carbinols of Formula VIII to the compounds of Formula IX may be carried out, for example, by the Oppenauer method, e.g. by heating the carbinol in the presence of aluminium isopropoxide under reflux in cyclohexanone and toluene.

The compounds of Formula VIII wherein R₄ is an alkyl, alkenyl or cycloalkyl group and R₇ is a hydrogen atom may be prepared by the reaction of an aldehyde of the general formula:

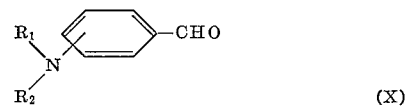

wherein R₁ and R₂ are as hereinbefore defined, with a Grignard reagent of formula R₄MgX₂, wherein R₄ is as hereinbefore defined and X₂ represents a chlorine, bromine or iodine atom.

According to a further feature of this invention, the compounds of Formula I wherein A represents an oxygen atom, are prepared by quaternisation of the grouping R₁R₂N— of a compound of the general formula:

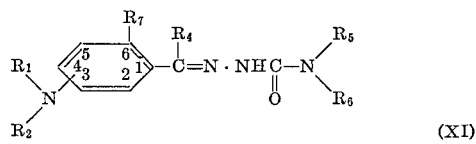

wherein R₁R₂N is the 3- or 4-position and R₁, R₂, R₄, R₅, R₆ and R₇ are as hereinbefore defined, with a compound of the formula R₃X₁, wherein R₃ and X₁ are as hereinbefore defined. The reaction may be carried out at room temperature or by heating in an inert solvent, for example a lower aliphatic alcohol, e.g. methanol or ethanol.

The starting materials of Formula XI may be prepared by reacting an aldehyde or ketone of Formula IX with a semicarbazide of Formula III, wherein A represents an oxygen atom, by known methods.

Salts of Formula I not directly obtainable by the aforesaid process, e.g. the tartrates, citrates and phosphates, can be formed from salts so obtained by direct metathesis, for example by reaction with the silver salt of the appropriate acid, or through the hydroxide. Where a salt of the present invention is water-soluble it can, according to a feature of this invention, be isolated from aqueous solution by treatment with a water-soluble salt (such as the sodium or ammonium salt) of 4,4'-diaminostilbene-2,2'-disulphonic acid (which acid—also called amsonic acid—is almost insoluble in water even at boiling point) whereby the amsonate containing the required cation is prepicitated, formation of a hot aqueous solution of the amsonate and treatment of the resulting solution with an acid having the anion of the required quaternary ammonium salt thereby to liberate and precipitate amsonic acid, leaving the quaternary ammonium salt of the acidifying agent in solution in a substantially pure state. These salts may be isolated in a similar manner by using a water-soluble salt, e.g. the ammonium salt of 2,2′-dihydroxy-1,1′-dinaphthylmethane-3,3′-dicarboxylic acid (which acid—also called embonic acid—is also almost insoluble in water even at boiling point).

It will be appreciated that these separation procedures can be applied to the conversion of a salt directly obtainable by the aforesaid process (e.g. a halide) into a corresponding salt (e.g. tartrate, citrate or phosphate) which is not directly obtainable by the process. Thus, by starting with an aqueous solution containing a halide and reacting the resultant amsonate, not with a hydrohalic acid but with tartaric acid, the final product obtained is the corresponding tartrate. In addition, one soluble salt may be converted into another soluble salt by the use of an ion-exchange resin. For example, a methiodide may be converted into a methochloride by passing through a column packed with IR 400 ion exchange resin (chloride form).

By the term "known methods" as used in the present specification is meant methods heretofore used or described in the chemical literature.

The following examples illustrate the preparation of new compounds according to the present invention.

EXAMPLE I p-Dimethylaminophenyl heptyl ketone methiodide (1.95 g.) and thiosemicarbazide (0.455 g.) were heated under reflux in ethanol (10 ml.) for two hours. The solution was cooled and diluted with diethyl ether to give crystalline material which was recrystallised from isopropanol to give p-dimethylaminophenyl heptyl ketone methiodide thiosemicarbazone (1.3 g.) in the form of cream coloured needles, M.P. 122–123° C.

Similarly prepared were:

p-dimethylaminophenyl ethyl ketone methiodide thiosemicarbazone, M.P. 178–180° C.,
p-dimethylaminophenyl propyl ketone methiodide thiosemicarbazone, M.P. 174–175° C.,
p-diethylaminophenyl butyl ketone methiodide thiosemicarbazone, M.P. 179–180° C.,
p-dimethylaminophenyl hexyl ketone methiodide thiosemicarbazone, M.P. 145–146° C.,
p-dimethylaminophenyl octyl ketone methiodide thiosemicarbazone, M.P. 136–137° C.,
p-dimethylaminophenyl nonyl ketone methiodide thiosemicarbazone, M.P. 128° C.,
p-dimethylaminophenyl decyl ketone methiodide thiosemicarbazone, M.P. 123° C., and
p-dimethylaminophenyl cyclohexyl ketone methiodide thiosemicarbazone, M.P. 177° C., from respectively p-dimethylaminophenyl ethyl ketone methiodide, p-dimethylaminophenyl propyl ketone methiodide, p-diethylaminophenyl butyl ketone methiodide, p-dimethylaminophenyl hexyl ketone methiodide, p-dimethylaminophenyl octyl ketone methiodide, p-dimethylaminophenyl nonyl ketone methiodide, p-dimethylaminophenyl decyl ketone methiodide and p-dimethylaminophenyl cyclohexyl ketone methiodide.

The p-dimethylaminophenyl heptyl ketone methiodide used as starting material in the above preparation was obtained as follows:

Phosphorus pentoxide (50 g.) was added portionwise over 10 minutes to a well-stirred mixture of n-caprylic acid (96 g.), dimethylaniline (232 g.) and "Hyflo-Supercel" (8 g.). The mixture was refluxed with stirring for 4 hours, and then allowed to stand overnight. The liquid layer was poured into ice water, and the residue treated with hot water. The aqueous suspensions were combined and the combined mixture basified with 50% w./v. sodium hydroxide solution, filtered, and extracted with 3× 100 ml. benzene. The combined benzene extracts were dried over sodium sulphate, then evaporated in vacuo and the residue distilled. The fraction boiling above 140° C. at 0.05 mm. Hg solidified on cooling and was recrystallised from petroleum ether (B.P. 40–60° C.) to give p-dimethylaminophenyl heptyl ketone (23 g.), M.P. 47–49° C.

p-Dimethylaminophenyl heptyl ketone (12 g.) was refluxed for 72 hours with methyl iodide (36 ml.). The solid which separated was collected after each 24 hour period. The combined solids were recrystallised from ethanol to give p-dimethylaminophenyl heptyl ketone methiodide (11.5 g.) in the form of colourless plates, M.P. 145–146° C.

Similarly prepared were p-dimethylaminophenyl ethyl ketone methiodide, M.P. 139–140° C., from p-dimethylaminophenyl ethyl ketone, M.P. 101° C.; p-dimethylaminophenyl propyl ketone methiodide, M.P. 150–151° C., from p-dimethylaminophenyl propyl ketone, M.P. 72–73° C.; p-diethylaminophenyl butyl ketone methiodide, M.P. 119–121° C., from p-diethylaminophenyl butyl ketone, M.P. 52–54° C.; p-dimethylaminophenyl hexyl ketone methiodide, M.P. 133–135° C., from p-dimethylaminophenyl hexyl ketone, M.P. 41–42° C.; p-dimethylaminophenyl octyl ketone methiodide, M.P. 147° C., from p-dimethylaminophenyl octyl ketone, M.P. 58–59° C.; p-dimethylaminophenyl nonyl ketone methiodide, M.P. 144–145° C., from p-dimethylaminophenyl nonyl ketone, M.P. 58° C.; p-dimethylaminophenyl decyl ketone methiodide, M.P. 152–153° C., from p-dimethylaminophenyl decyl ketone, M.P. 67–68° C., and p-dimethylaminophenyl cyclohexyl ketone methiodide, M.P. 159–160° C., from p-dimethylaminophenyl cyclohexyl ketone, M.P. 87–88° C.

EXAMPLE II p-Dimethylaminophenyl propyl ketone methiodide was condensed with 4-methylthiosemicarbazide by the procedure described in Example I to give p-dimethylaminophenyl propyl ketone methiodide 4′-methyl-thiosemicarbazone, M.P. 175° C.

Similarly prepared was p-dimethylaminobenzaldehyde methiodide 4′-methylthiosemicarbazone, M.P. 195–196° C.

EXAMPLE III p-Dimethylaminophenyl propyl ketone methiodide (3.33 g.) and 4,4-dimethylthiosemicarbazide (1.19 g.) were separately dissolved in the minimum volume of hot water and the solutions were mixed and allowed to stand at room temperature for 3 days. The crystals which separated were filtered off to give p-dimethylaminophenyl propyl ketone methiodide 4′,4′-dimethylthiosemicarbazone (1.5 g.), M.P. 150° C.

EXAMPLE IV p-Diethylaminophenyl propyl ketone (B.P. 140–145° C./0.05 mm. Hg, prepared from diethylaniline by the method of Example I) (10 g.) was converted to the methiodide by heating under reflux with methyl iodide (50 ml.) and methanol (50 ml.) for 9 days. The syrup remaining after removal of the solvents was refluxed for 3 hours with thiosemicarbazide (5 g.) in ethanol (100 ml.) to give, after removal of unchanged thiosemicarbazide and some of the ethanol, p-diethylaminophenyl propyl ketone methiodide thiosemicarthazone (5.3 g.), M.P. 184–185° C.

EXAMPLE V p-Dimethylaminophenyl heptyl ketone ethotoluene-p-sulphonate (1.12 g.) and thiosemicarbazide (0.23 g.) were heated under reflux in ethanol (10 ml.) for three hours. The solution was cooled and diluted with diethyl ether to give a syrup, which was dissolved in the minimum volume of water and treated with excess sodium iodide. The solid which separated was recrystallised from isopropanol to give p-dimethylaminophenyl heptyl ketone ethiodide thiosemicarbazone (0.52 g.), M.P. 138–139° C.

Similarly prepared was p-dimethylaminophenyl butyl ketone ethiodide thiosemicarbazone, M.P. 163–165° C.

The p-dimethylaminophenyl heptyl ketone ethotoluene-p-sulphonate used as a starting material in the above preparation was obtained as follows:

p-Dimethylaminophenyl heptyl ketone (4.94 g.) was heated on the steam bath with ethyl toluene-p-sulphonate (4.0 g.) for 64 hours to give a product with crystallised from acetone to give p-dimethylaminophenyl heptyl ketone ethotoluene-p-sulphonate (3.7 g.), M.P. 233–234° C.

Similarly prepared was p-dimethylaminophenyl butyl ketone ethotoluene-p-sulphonate, M.P. 215–216° C., from p-dimethylaminophenyl butyl ketone, M.P. 37–38° C., prepared by the method of Example I.

EXAMPLE VI p-Dimethylaminophenyl heptyl ketone was converted by treatment with methyl iodide into the corresponding methiodide, M.P. 129–133° C., and then into p-diethylaminophenyl heptyl ketone methiodide thiosemicarbazone, M.P. 129–130° C., by the method of Example I.

The aminoketone was obtained as follows:

p-Diethylaminophenyl heptyl carbinol (11 g.), toluene (400 ml.) and cyclohexanone (70 ml.) were partially distilled to remove water azeotropically. The residue was treated with aluminium isopropoxide (6 g.) in toluene (150 ml), then heated under reflux for 3.5 hours; water was added and the mixture filtered. The organic layer was separated, the aqueous layer extracted twice with benzene (100 ml.) and the organic solutions combined. Removal of the solvents and distillation of the residue gave p-diethylaminophenyl heptyl ketone (7.3 g.), B.P. 165–170° C./0.1 mm. Hg.

Similarly prepared were p-pyrrolidin-1'-yl-phenyl heptyl ketone, M.P. 75–76° C., and p-methylpropylaminophenyl heptyl ketone, B.P. 195–202° C./0.3 mm. Hg, from p-pyrrolidin-1'-yl-phenyl heptyl carbinol and p-methylpropylaminophenyl heptyl carbinol respectively.

The p-diethylaminophenyl heptyl carbinol was obtained as follows:

p-Diethylaminobenzaldehyde (7.08 g.) in diethyl ether (100 ml.) was added with stirring over 0.5 hour to a Grignard reagent prepared from n-heptyl bromide (15 g.) and magnesium (2.3 g.) in ether (100 ml.). The whole was allowed to stir for a further 1 hour, decanted from excess magnesium and decomposed with ice and 2 N sulphuric acid. The ether layer was extracted with 2 N sulphuric acid (100 ml.) and discarded. The combined acid solutions were basified with ammonia and the solution extracted with diethyl ether (3× 100 ml.). The extracts were dried over anhydrous sodium sulphate and the ether removed to give p-diethylaminophenyl heptyl carbinol (11.0 g.) as a pale yellow liquid.

Similarly prepared were p-pyrrolidin-1'-yl-phenyl heptyl carbinol, M.P. 47–48° C., and p-methylpropylaminophenyl heptyl carbinol, yellow liquid, from p-pyrrolidin-1'-yl-benzaldehyde (Phillips and Burrows U.S. Pat. No. 3,075,975) and p - methylpropylamino - benzaldehyde (Netherlands patent application No. 6403015, CA. 62, P9113f) respectively.

EXAMPLE VII p-Pyrrolidin-1'-yl-phenyl heptyl ketone methotoluene-p-sulphonate, prepared according to Example V from p-pyrrolidin-1'-yl-phenyl heptyl ketone, was condensed with thiosemicarbazide by the procedure described in Example I to give p-pyrrolidin-1'-yl-phenyl heptyl ketone methotoluene-p-sulphonate thiosemicarbazone as hygroscopic leaflets, M.P. 95–97° C.

EXAMPLE VIII p-Methylpropylaminophenyl heptyl ketone methiodide was condensed with thiosemicarbazide by the procedure described in Example I to give p-methylpropylaminophenyl heptyl ketone methiodide thiosemicarbazone, M.P. 126–130° C.

The methiodide was obtained as follows:

p-Methylpropylaminophenyl heptyl ketone methotoluene-p-sulphonate, obtained by the procedure of Example V from p-methylpropylaminophenyl heptyl ketone (3.4 g.), was dissolved in the minimum volume of warm acetone and sodium iodide (1.13 g.) in warm acetone added. Sodium toluene-p-sulphonate was removed and the solution concentrated to small volume and treated with excess diethyl ether. The solid which separated was recrystallised from water to give p-methylpropylaminophenyl heptyl ketone methiodide, M.P. 111–113° C.

Similarly prepared were p-dimethylaminophenyl butyl ketone ethiodide, M.P. 137–139° C., and p-dimethylaminophenyl heptyl ketone ethiodide, M.P. 120–122° C. (except that in the latter case water was used as solvent), from the corresponding ethotoluene-p-sulphonates prepared as in Example V.

EXAMPLE IX

A mixture of p-dimethylaminophenyl propyl ketone methiodide (3.33 g.), semicarbazide hydrochloride (1.2 g.) and anhydrous sodium acetate (0.9 g.) was refluxed for 6 hours in ethanol (75 ml.), cooled, and a solid filtered off. The filtrate was concentrated and a further quantity of solid material obtained. The combined solids were recrystallised twice from ethanol to give p-dimethylaminophenyl propyl ketone methiodide semicarbazone (3.2 g.) in the form of cream-coloured needles, M.P. 186–187° C.

Similarly prepared were p-dimethylaminophenyl butyl ketone ethiodide semicarbazone, M.P. 154–156° C., p-diethylaminophenyl butyl ketone methiodide semicarbazone, M.P. 171–172° C., p-dimethylaminophenyl hexyl ketone methiodide semicarbazone, M.P. 127–128° C., p-dimethylaminophenyl heptyl ketone methiodide semicarbazone, M.P. 147–150° C., p-dimethylaminophenyl heptyl ketone ethiodide semicarbazone, M.P. 157–159° C., p-diethylaminophenyl heptyl ketone methiodide semicarbazone, M.P. 161–162° C., p-dimethylaminophenyl octyl ketone methiodide semicarbazone, M.P. 147–149° C. and p-dimethylaminophenyl nonyl ketone methiodide semicarbazone, M.P. 141° C.

EXAMPLE X 6-dimethylamino-1-tetralone methiodide (5.0 g.) in ethanol (35 ml.) was treated with thiosemicarbazide (1.36 g., dissolved in the minimum volume of hot water), and the mixture heated under reflux for 3.5 hours. The product which separated on cooling was recrystallised from water to give 6-dimethylamino-1-tetralone methiodide thiosemicarbazone (4.0 g.), M.P. 209–210° C.

The 6-dimethylamino-1-tetralone methiodide was obtained as follows:

6-amino-1-tetralone (16.1 g.) (prepared according to Allinger and Jones, J. Org. Chem., 1962, 27, 70), methyl iodide (100 ml.) and anhydrous sodium carbonate (10.6 g.) in water (150 ml.) were heated under reflux for 48 hours. The aqueous solution was separated and concentrated to dryness under reduced pressure. Extraction of the residue by boiling with isopropanol and concentration of the extract gave 6-dimethylamino-1-tetralone methiodide (20 g.), M.P. 147–148° C.

EXAMPLE XI 6-dimethylamino-1-tetralone ethiodide was converted into its thiosemicarbazone, M.P. 195–196° C., by the method of Example X (except that the thiosemicarbazide was not dissolved in water prior to use). 6-diethylamino-1-tetralone methotoluene-p-sulphonate thiosemicarbazone, M.P. 160–162° C., was similarly prepared.

The quaternary ketones were obtained as follows:

6-amino-1-tetralone (16.1 g.) was treated with ethyl iodide (100 ml.) and anhydrous sodium carbonate (11 g.) in water (150 ml.) and the mixture heated under reflux for 48 hours. The organic layer was separated, dried over anhydrous sodium sulphate and distilled. The residue was extracted with 100 ml. portions of boiling petroleum ether, B.P. 60–80° C., until no more dissolved. The combined extracts were chilled when 6-ethylamino-1-tetralone (3.8 g.), M.P. 87–88° C., separated. The residual solution was distilled leaving 6-diethylamino-1-tetralone (11 g.) as a thick yellow syrup, characterised as the picrate, M.P. 157–158° C.

Treatment of 6-ethylamino-1-tetralone (3.8 g.) with methyl iodide (25 ml.) and sodium carbonate (1.06 g.) in water (50 ml.) by the method of Example X gave 6-dimethylamino-1-tetralone ethiodide, M.P. 169–170° C.

6-diethylamino-1-tetralone (8.6 g.) heated on the steam bath with methyltoluene-p-sulphonate (7.5 g.) gave a product which crystallised from acetone to give 6-diethylamino-1-tetralone methotoluene-p-sulphonate (5.4 g.), M.P. 151–153° C.

EXAMPLE XII 6-pyrrolidin-1'-yl-1-tetralone methotoluene-p-sulphonate was converted into 6-pyrrolidin-1'-yl-1-tetralone methotoluene-p-sulphonate thiosemicarbazone, M.P. 137–138° C., by the method of Example XI.

The quaternary ketone was obtained as follows:

A mixture of 6-amino-1-tetralone (8.05 g.), 1,4-dibromobutane (10.8 g.) and anhydrous sodium carbonate (5.3 g.) was heated under reflux in ethanol (100 ml.) for 24 hours. After removal of the ethanol the residue was dissolved in water, basified with 2 N sodium hydroxide and extracted three times with an equal volume of diethyl ether. Removal of the ether gave a syrup (5.0 g.), which was heated for 24 hours on the steam bath with methyl iodide (50 ml.) and anhydrous sodium carbonate (1.42 g.) in water (50 ml.). The methyl iodide was removed and combined with an ethereal extract of the aqueous solution. Removal of the solvents gave 6-pyrrolidin-1'-yl-1-tetralone (0.9 g.), M.P. 103–104° C.

Treatment of the tertiary amine with methyl toluene-p-sulphonate gave 6-pyrrolidin-1'-yl-1-tetralone methotoluene-p-sulphonate, M.P. 195–196° C.

EXAMPLE XIII m-Dimethylaminophenyl heptyl ketone methiodide was converted into m-dimethylaminophenyl heptyl ketone methiodide thiosemicarbazone, M.P. 159–162° C., by the method of Example XI.

The quaternary ketone was obtained as follows:

m-Dimethylaminophenyl heptyl ketone (6.75 g.) was refluxed for 24 hours with methyl iodide (30 ml.). The solid which separated was crystallised from acetone-ether to give m-dimethylaminophenyl heptyl ketone methiodide (10.5 g.), M.P. 131–134° C.

The aminoketone was prepared as follows:

m-Dimethylaminophenyl heptyl carbinol (12.7 g.), toluene (400 ml.) and cyclohexanone (80 ml.) were partially distilled to remove water azeotropically. The residue was treated with aluminium isopropoxide (7 g.) in toluene (100 ml.), then heated under reflux for 3.5 hours; water was added and the mixture filtered. The organic layer was separated, the aqueous layer extracted twice with benzene (100 ml.) and the organic solutions combined. Removal of the solvents and distillation of the residue gave m-dimethylaminophenyl heptyl ketone (6.75 g.), B.P. 142–144° C./0.15 mm. Hg, M.P. 25–27° C.

The carbinol was obtained as follows:

m-Dimethylaminobenzaldehyde (prepared according to Bottomley et al, J. Chem. Soc., 1937, 1891) (10 g.) in diethyl ether (200 ml.) was added with stirring over 0.5 hour to a Grignard reagent prepared from n-heptyl bromide (24 g.) and magnesium (4.0 g.) in diethyl ether (200 ml.). The whole was allowed to stir for a further 1 hour, decanted from excess magnesium and decomposed with ice and 2 N sulphuric acid. The ether layer was extracted with 2 N sulphuric acid (100 ml.) and discarded. The combined acid solutions were basified with ammonia and the solution extracted with diethyl ether (3× 100 ml.). The extracts were dried (sodium sulphate) and the ether removed to give m-dimethylaminophenyl heptyl carbinol (12.7 g.) as a pale yellow liquid.

EXAMPLE XIV 6-dimethyl-1-tetralone methiodide (5.0 g.) (prepared as described in Example X), semicarbazide hydrochloride (1.8 g.) and anhydrous sodium acetate (1.35 g.) were refluxed for 3 hours in ethanol (100 ml.) and sufficient water to maintain a clear solution. On cooling 6-dimethylamino-1-tetralone methiodide semicarbazone (5.3 g.), M.P. 230–231° C., separated.

Similarly prepared were 6-dimethylamino-1-tetralone ethiodide semicarbazone, M.P. 228–230° C. (from the quaternary ketone described in Example XI), and 6-diethylamino-1-tetralone methotoluene-p-sulphonate semicarbazone, M.P. 197–199° C. (from the quaternary ketone described in Example XI).

EXAMPLE XV 6-diethylamino-1-tetralone methotoluene-p-sulphonate semicarbazone (prepared as in Example XIV) (2.3 g.) was dissolved in the minimum volume of hot water and excess of sodium iodide added. The turbid solution was filtered and chilled. The crystalline material which separated was crystallised from aqueous ethanol to give 6-diethylamino-1-tetralone methiodide semicarbazone (1.3 g.), M.P. 220–223° C.

EXAMPLE XVI p-Dimethylaminophenyl butyl ketone semicarbazone (3.19 g.) and methyl toluene-p-sulphonete (1.86 g.) were heated under reflux for 12 hours in a mixture of toluene (5 ml.) and methanol (5 ml.). The solvents were removed and the residue crystallised twice from isopropanol to give p-dimethylaminophenyl butyl ketone methotoluene-p-sulphonate semicarbazone (2 g.), M.P. 198–200° C.

The semicarbazone was obtained as follows:

A mixture of p-dimethylaminophenyl butyl ketone (5.0 g.), semicarbazide hydrochloride (2.2 g.) and anhydrous sodium acetate (2.0 g.) in ethanol (100 ml.) was refluxed for 6 hours. Crystalline material which separated was recrystallised from ethanol (after addition of petroleum ether, B.P. 60–80° C., to incipient turbidity) to give p-dimethylaminophenyl butyl ketone semicarbazone (2.5 g.), M.P. 188–189° C.

EXAMPLE XVII

Sodium iodide (0.5 g.) was added to a solution of p-dimethylaminophenyl butyl ketone methotoluene-p-sulphonate semicarbazone (1.12 g., prepared as described in Example XVI) in water (5 ml.), the mixture was warmed and the clear solution was then evaporated to dryness under reduced pressure. The residue was extracted with boiling isopropanol (2× 25 ml.), and the combined extracts were filtered and concentrated to low volume. The crystalline material which separated was recrystallised from methanol to give p-dimethylaminophenyl butyl ketone methiodide semicarbazone (0.61 g.), M.P. 169–170° C., identical with a specimen prepared from p-dimethylaminophenyl butyl ketone methiodide by the method of Example I.

EXAMPLE XVIII

A solution of p-diethylaminophenyl butyl ketone methiodide thiosemicarbazone (1.12 g.) in water (250 ml.) was run during 2 hours through a column of IR 400 ion exchange resin (chloride form; 20 ml. damp solid). The column was washed with more water (100 ml.) and the combined eluates evaporated in vacuo to 30 ml. The resulting solution was freeze dried to give the methochloride (0.8 g.) as a free flowing white powder, M.P. 135–138° C. (after softening and sintering at 100–110° C.).

Similarly prepared was p-dimethylaminophenyl heptyl ketone ethochloride thiosemicarbazone.

EXAMPLE XIX p-Butylmethylaminophenyl heptyl ketone methotoluene-p-sulphonate (10 g.; prepared according to Example V from p-butylmethylaminophenyl heptyl ketone), thiosemicarbazide (2 g.) and sodium iodide (3.15 g.) were heated under reflux in 50% aqueous ethanol (100 ml.) for 8 hours. The solvent was removed by distillation under reduced pressure and acetone (100 ml.) added. The suspension was filtered to eliminate sodium toluene-p-sulphonate, and the filtrate concentrated to a volume of about 30 ml. under reduced pressure. Diethyl ether was added to incipient turbidity and the mixture maintained at 0° C. for several days. The product which separated was crystallised from isopropanol to give p-butylmethylaminophenyl heptyl ketone methiodide thiosemicarbazone (7.0 g.) as cream needles, M.P. 134–136° C.

The p-butylmethylaminophenyl heptyl ketone used as starting material in the above preparation, was prepared from p-butylmethylaminophenyl heptyl carbinol, itself prepared from p-butylmethylaminobenzaldehyde, by the method of Example VI. The p-butylmethylaminobenzaldehyde was prepared according to the method of Netherlands patent application No. 6403015, C.A. 62 P.9113f.

EXAMPLE XX p-Dimethylaminophenyl heptyl ketone ethiodide thiosemicarbazone (0.30 g.; prepared according to Example V) in water (60 ml.) was treated with a solution of ammonium embonate (25 ml.; prepared by adding excess of embonic acid to 2 N ammonium hydroxide solution and filtering). The liquid was decanted from the sticky solid which formed, and the latter was washed with water by decantation. The solid was treated with the theoretical amount of 2 N hydrochloric acid and embonic acid removed by filtration to give a solution of p-dimethylaminophenyl heptyl ketone ethochloride thiosemicarbazone.

This same conversion was also effected using ammonium amsonate instead of ammonium embonate.

EXAMPLE XXI p-Dimethylaminophenyl heptyl ketone ethiodide thiosemicarbazone (0.15 g.; prepared according to Example V) was dissolved in methanol (10 ml.), treated with freshly prepared silver chloride (0.20 g.) and shaken vigorously for 20 minutes. Silver salts were removed by filtration, and the filtrate evaporated to leave p-dimethylaminophenyl heptyl ketone ethochloride thiosemicarbazone.

The present invention includes within its scope pharmaceutical compositions which comprise, as active ingredient, at least one semicarbazone or thiosemicarbazone quaternary salt of Formula I in association with a pharmaceutical carrier, which may be a solid material or a liquid. In clinical practice the compounds of the present invention will normally be administered by injection, so that compositions suitable for parenteral administration are preferred.

Preparations for parenteral administration are preferably in the form of sterile solutions in water of readily soluble salts. However, sterile solutions in other suitable solvent media can be employed as also may sterile suspensions of sparingly soluble salts in water, oil or other inert solvents such as propylene glycol, with or without the addition of soluble or insoluble diluents and/or solid or liquid excipients. They may be sterilised by, for example, filtration through a bacteria-retaining filter, by incorporation in the compositions of sterilising agents, by irradiation, or by heating. Such compositions may also take the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage for the therapeutic effect desired in the species of animal shall be obtained. Obviously several unit dosage forms may be administred at the same time. The preferred percentage of active substances in the pharmaceutical compositions is 0.01 to 20%, preferably 0.1 to 10%.

The following examples—directed to the preparation of solutions suitable for parenteral administration—illustrate pharmaceutical compositions according to the invention.

EXAMPLE XXII

A solution was prepared from:

|  | G. |
|---|---|
| p-Dimethylaminophenyl heptyl ketone ethochloride thiosemicarbazone | 2.5 |
| Sodium chloride | 7.2 |

Distilled water, up to 1000 ml.

by dissolving the thiosemicarbazone and the sodium chloride in the distilled water. The solution was filtered and filled into ampoules which were sterilised in an autoclave.

EXAMPLE XXIII

A solution was prepared from:
p-Diethylaminophenyl butyl ketone methochloride thiosemicarbazone—10 g.
Distilled water—1000 ml.

By dissolving the thiosemicarbazone in the disilled water. The solution was filtered and filled into ampoules which were sterilised in an autoclave.

We claim:
1. A quaternary salt of the formula:

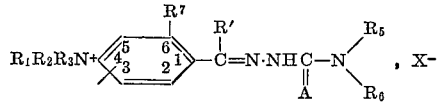

wherein the group $R_1R_2R_3N^+$ is in the 3- or 4-position of the benzene radical, $R_1$, $R_2$ and $R_3$, when taken separately, each represent lower alkyl or $R_1$ and $R_2$, when taken together with the nitrogen atom to which they are attached, represent pyrrolidin-1-yl, $R_4$ represents hydrogen, alkyl of 2 through 10 carbon atoms, or cyclohexyl, A represents oxygen or sulphur, $R_5$ and $R_6$ each represent hydrogen or lower alkyl, at least one of $R_5$ and $R_6$ being lower alkyl when $R_4$ is hydrogen, $R_7$ represents hydrogen or $R_7$ and $R_4$ linked together represent a trimethylene chain, and $X^-$ represents a pharmaceutically acceptable non-toxic anion.

2. A quaternary salt according to claim 1 in which $R_5$ and $R_6$ represent hydrogen atoms or methyl groups.

3. A quaternary salts according to claim 1 in which $R_1$, $R_2$ and $R_3$ represent methyl or ethyl.

4. A quaternary salt according to claim 1 in which $R_4$ represents butyl, hexyl or heptyl.

5. A quaternary salt according to claim 1 in which $X^-$ represents a bromide, iodide or chloride ion, or an ion of the formula $R_8\text{—}SO_2\text{—}O^-$, wherein $R_8$ represents alkoxy, alkyl or hydroxyalkyl of 1 through 4 carbon atoms, or phenyl or lower alkyl substituted phenyl, or a tartrate or citrate ion.

6. A quaternary salt according to claim 1 in which $X^-$ represents an iodide, chloride or toluene-p-sulphonate ion.

7. The quaternary salt according to claim 1 which is p-diethylaminophenyl butyl ketone methiodide thiosemicarbazone.

8. The quaternary salt according to claim 1 which is p-diethylaminophenyl butyl ketone methochloride thiosemicarbazone.

9. The quaternary salt according to claim 1 which is p-dimethylaminophenyl hexyl ketone methiodide thiosemicarbazone.

10. The quaternary salt according to claim 1 which is p-dimethylaminophenyl heptyl ketone methiodide thiosemicarbazone.

11. The quaternary salt according to claim 1 which is p-dimethylaminophenyl heptyl ketone ethiodide thiosemicarbazone.

12. The quaternary salt according to claim 1 which is p-dimethylaminophenyl heptyl ketone ethochloride thiosemicarbazone.

13. The quaternary salt according to claim 1 which is p-pyrrolidin-1-ylphenyl heptyl ketone methotoluene-p-sulphonate thiosemicarbazone.

14. The quaternary salt according to claim 1 which is p-dimethylaminophenyl heptyl ketone methiodide semicarbazone.

15. The quaternary salt according to claim 1 which is 6-dimethylamino - 1 - tetralone methiodide thiosemicarbazone.

16. The quaternary salt according to claim 1 which is 6-dimethylamino-1-tetralone methiodide semicarbazone.

17. Pharmaceutical compositions which comprise, as active ingredient, a semicarbazone or thiosemicarbazone quaternary salt of the formula specified in claim 1 in association with a pharmaceutical carrier, the composition containing 0.01 to 20% by weight of said quaternary salt.

References Cited
UNITED STATES PATENTS 2,530,430  11/1950  Hirt _____ 260—552

FOREIGN PATENTS 584,381  1/1947  Great Britain _____ 260—552

ALEX MAZEL, Primary Examiner

J. A. NARCAVAGE, Assistant Examiner

U.S. Cl. X.R.

260—240, 247.1, 247.2, 293.4, 294, 326.3, 552, 554; 424—274, 323